United States Patent

Hofmann et al.

[11] Patent Number: 5,857,546
[45] Date of Patent: Jan. 12, 1999

[54] MULTIPLE-DISK FRICTION CLUTCH

[75] Inventors: Klaus Hofmann, Leutershausen; Rolf Münz, Schwebheim; Wilfried Pfeuffer, Stettbach; Elmar Unsleber, Pfersdorf, all of Germany

[73] Assignee: Fichtel & Sachs AG, Schweinfurt, Germany

[21] Appl. No.: 850,856

[22] Filed: May 2, 1997

[30] Foreign Application Priority Data

May 23, 1996 [DE] Germany ............... 196 20 718.5

[51] Int. Cl.$^6$ ........................................... F16D 13/68
[52] U.S. Cl. ........................... 192/70.2; 192/109 R
[58] Field of Search .......................... 192/70.2, 109 R, 192/70.19, 70.16; 403/359

[56] References Cited

U.S. PATENT DOCUMENTS

| | | |
|---|---|---|
| 4,846,326 | 7/1989 | Tilton et al. . |
| 5,301,779 | 4/1994 | Nash .................................. 192/70.2 |
| 5,743,367 | 4/1998 | Hofmann et al. .................. 192/70.2 |

FOREIGN PATENT DOCUMENTS

| | | |
|---|---|---|
| 19 517 968 | 11/1995 | Germany . |
| 23 01 156 | 11/1996 | United Kingdom . |

*Primary Examiner*—Richard M. Lorence
*Attorney, Agent, or Firm*—Cohen, Pontani, Lieberman & Pavane

[57] ABSTRACT

A multiple-disk friction clutch, especially for motor vehicles, with a hub which has an internal toothing and can be placed on a gear shaft so as to be rotationally fixed relative thereto. At least two clutch disks are connected with the hub so as to be rotationally fixed relative thereto and project radially beyond the hub. A stop which guides the hub axially relative to the clutch disks is provided between the clutch disks. The hub is formed of two parts and includes a hub body having an outer toothing and a hub ring which has the same outer toothing and sits on a radial shoulder of the hub body. The outer toothing of the hub ring is offset by one tooth relative to the toothing of the hub body to form the stop for the clutch disks. The hub body and the hub ring are connected with one another so as to be rotationally fixed relative to one another.

4 Claims, 4 Drawing Sheets

MULTIPLE-DISK FRICTION CLUTCH

BACKGROUND OF THE INVENTION

1. Field of the Invention

The invention relates to a multiple-disk friction clutch, especially for motor vehicles. Such a friction clutch has a hub with an internal toothing and can be placed on a transmission shaft or gear shaft so as to be fixed with respect to rotation relative thereto. At least two clutch plates or disks are connected with the hub so as to be fixed with respect to rotation relative thereto and so as to project radially over the hub. A stop, which guides the hub axially relative to the clutch disks, is provided between the clutch disks.

2. Description of the Prior Art

A multiple-disk friction clutch of this type is known, for example, from U.S. Pat. No. 4,846,326. This clutch has a hub which is provided with axially projecting webs around its circumference on both sides. The clutch disks have a contour complementing the webs and can thus be fitted to the hub at both sides. The disk-like rim of the hub remaining between the webs serves as a stop for the clutch disks. Producing this hub is very costly in terms of manufacturing technique, since the webs must be machined out of solid material.

SUMMARY OF THE INVENTION

Accordingly, it is an object of the present invention to improve a generic multiple-disk friction clutch so that the production of the hub is simplified.

Pursuant to this object, and others which will become apparent hereafter, one aspect of the present invention resides in a hub formed of two parts including a hub body having an outer toothing and a hub ring which has the identical outer toothing and which sits on a radial shoulder of the hub body. The outer toothing of the hub ring is offset by one tooth relative to the outer toothing of the hub body to form the stop for the clutch disks. The hub body and the hub ring are connected with one another so as to be rotationally fixed relative to one another.

This hub can be produced very simply since the inner toothing and the outer toothing can be formed in a very simple and economical manner. Due to the two-part construction, the hub body and the hub ring can be produced separately without teeth. They are then joined axially and the outer toothing is subsequently produced simultaneously in the two joined structural component parts. The hub body and the hub ring are then rotated relative to one another so that the outer toothing is offset by one tooth whereby each tooth of the hub body will be located opposite to a tooth space of the hub ring, and vice versa. The oppositely located toothing then provides a stop for the clutch disk which is subsequently placed on the outer toothing.

The teeth of the hub body preferably engage in the spaces between the teeth of the hub ring and the teeth of the hub ring engage in the spaces between the teeth of the hub body. Stops are accordingly formed for every clutch disk. For this purpose a radial recess must be provided at the inner diameter of the hub ring. The outer toothing must be more deeply cut compared with the height of the radial recess so that the teeth can move past one another subsequently.

The hub body and the hub ring are preferably welded together so as to be locked with respect to relative rotation.

The outer toothing is preferably produced by wire electrical-discharge machining.

In another embodiment of the invention, only the hub body is provided with an inner toothing. The hub ring is then supported exclusively on the radial shoulder of the hub body. Manufacture is further simplified as a result of this construction.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
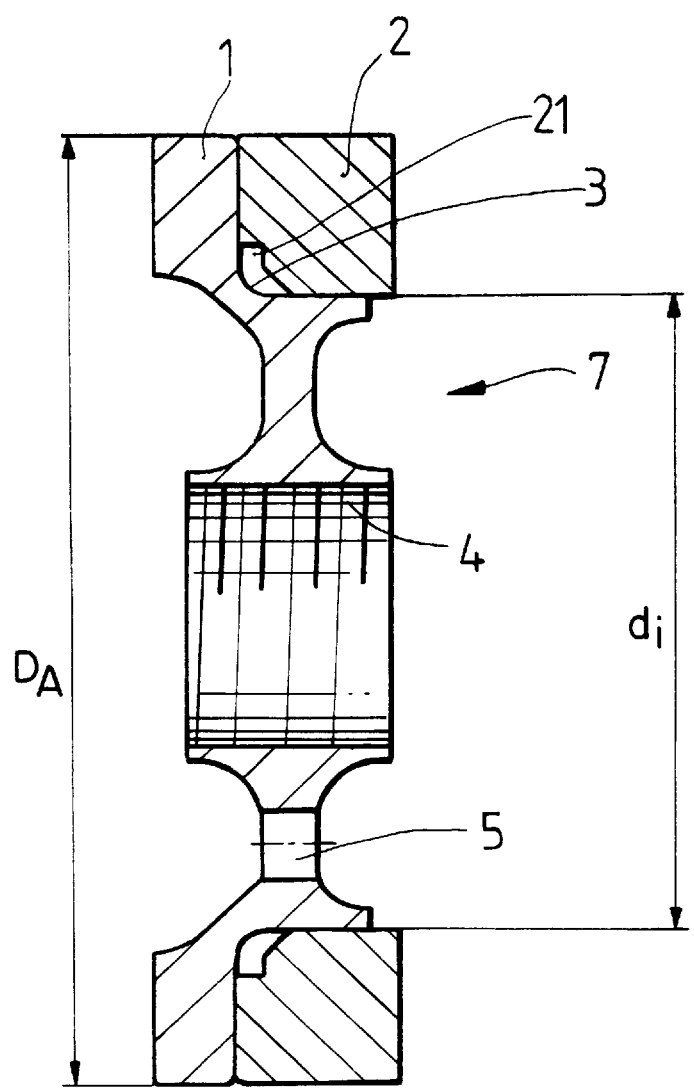
FIG. 1 shows an axial section of the hub before producing the outer toothing.

As seen in the figures, the hub 7 includes a hub body 1 and hub ring 2. The hub body 1 is provided with an inner toothing 4 by which the hub 7 can be placed on a correspondingly toothed gear shaft, not shown, and connected so as to be fixed with respect to rotation relative to it. FIG. 1 shows the hub 7 as a blank. The hub body 1 is provided with a radial step or radial shoulder 3. The radial shoulder 3 has an outer diameter corresponding to the inner diameter $d_i$ of the hub ring 2. The greatest outer diameter $D_A$ of the hub body 1 corresponds to the outer diameter of the hub ring 2. The hub body 1 is provided along its circumference with a plurality of bore holes 5 arranged between the center axis and the shoulder 3. The hub ring 2 is provided in its radial inner region with an axial stepped portion 21, the shape of which is shown in FIG. 1.

The hub ring 2 is fitted axially to the shoulder 3 of the hub body 1 until it strikes against the hub body 1. A slight press fit between the hub ring 2 and the hub body 1 suitably fixes the two structural component parts relative to one another. The outer toothing 6 is produced in the hub 7 in the form illustrated in FIG. 1 by wire electrical-discharge machining. In so doing, the hub body 1 is provided with a toothing 6a which is identical to a simultaneously produced toothing 6b of the hub ring 2. The depth of the toothing 6 is such that the toothing 6 projects over the stepped portion 21 of the hub ring 2. In this way it is ensured that the teeth 6', 6" will be able to run past one another later and that a stop is formed for every clutch disk 8, 9.

Figure 2:
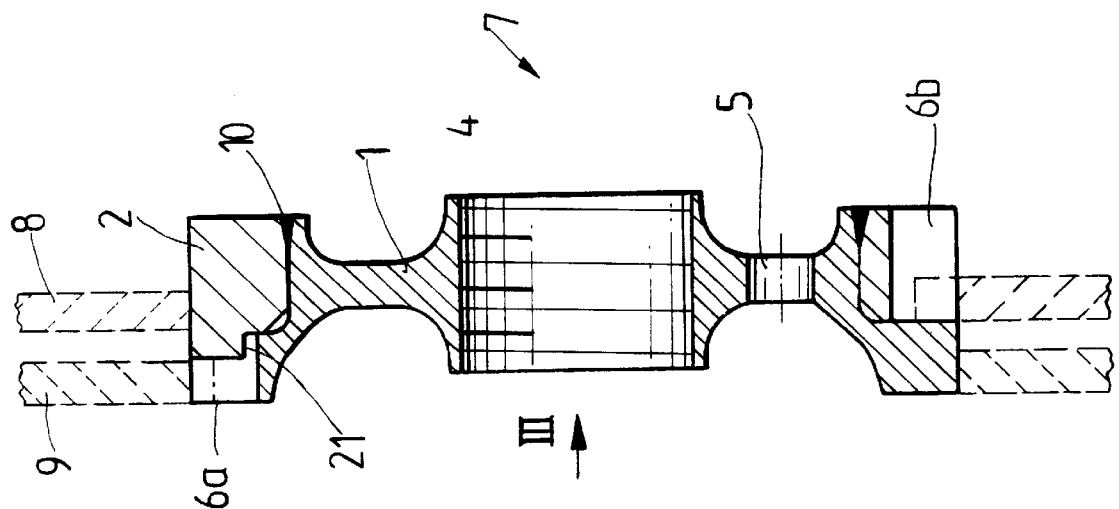
FIG. 2 shows an axial section of the finished hub.
Figure 3:
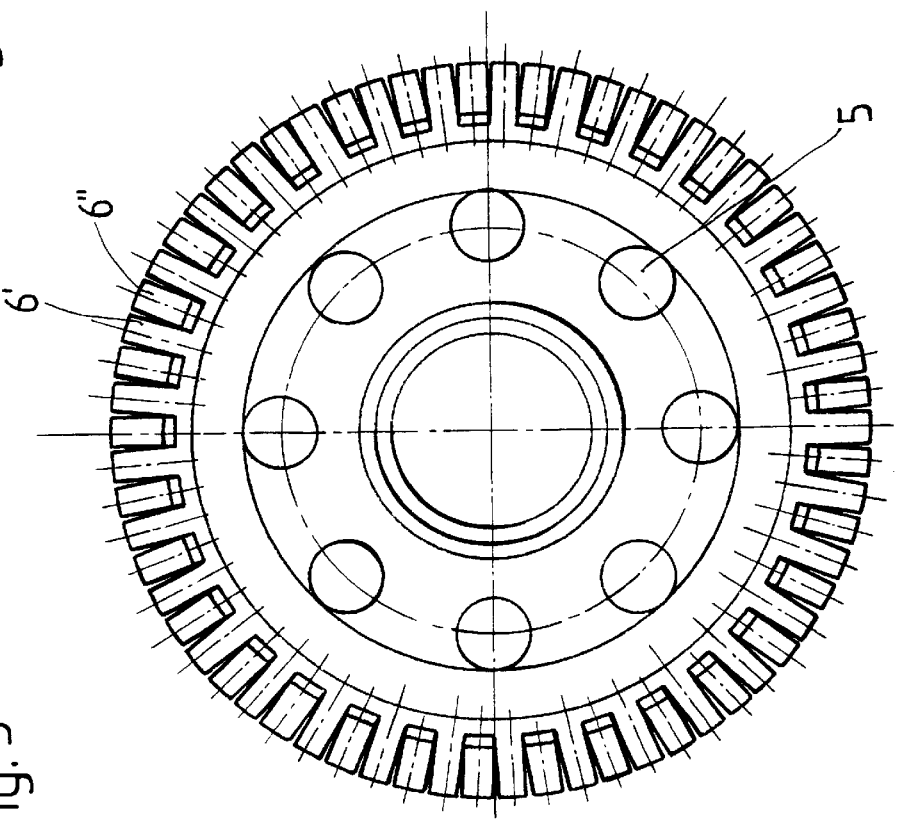
FIG. 3 is a plan view in the direction of arrow III in FIG. 2.
Figure 4:
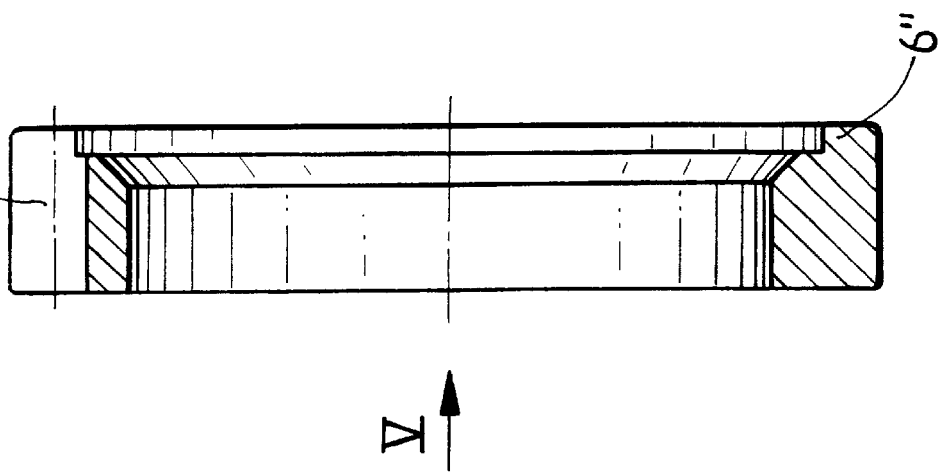
FIG. 4 shows an axial section of the hub ring.
Figure 5:
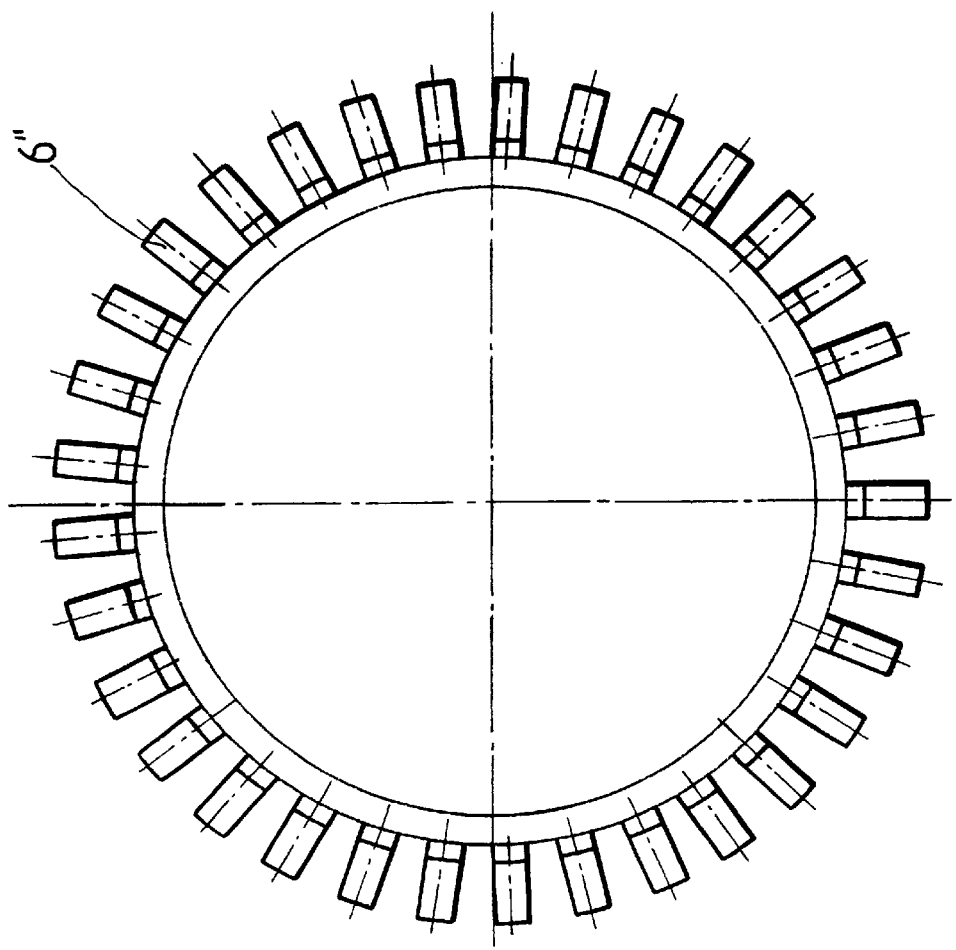
FIG. 5 is a plan view in the direction of arrow V in FIG. 4.
Figure 6:
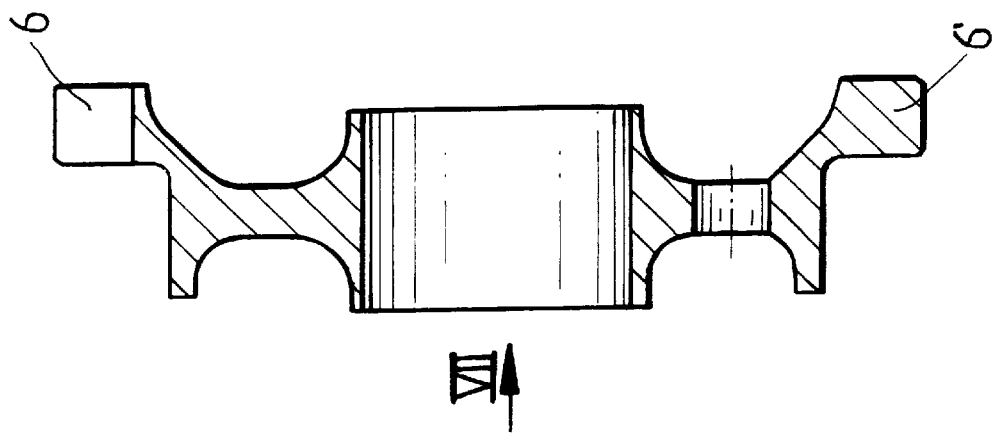
FIG. 6 shows an axial section of the hub body.
Figure 7:
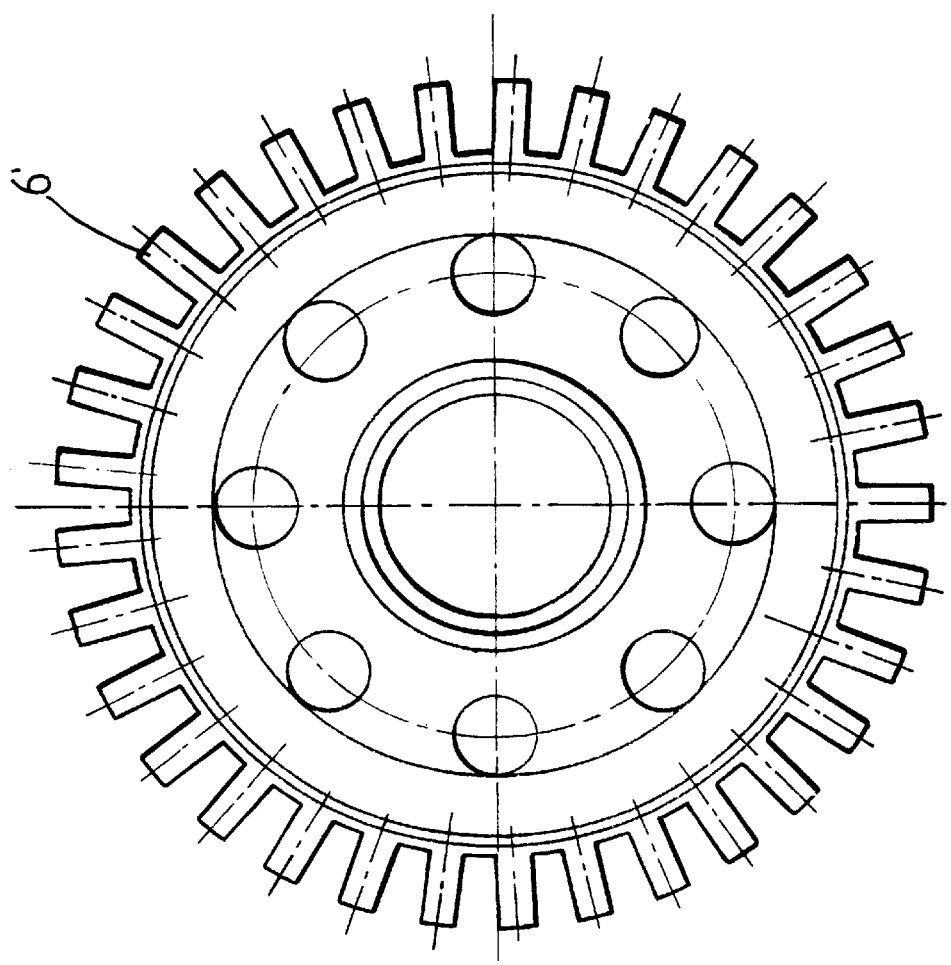
FIG. 7 is a plan view in the direction of arrow VII in FIG. 6.

After the outer toothing 6 is produced, the hub ring 2 is offset relative to the hub body 1 until an offset by one tooth 6', 6" is possible. The hub body 1 and the hub ring 2 are then further pushed together axially. In so doing, as is shown in FIGS. 2 and 3, each of the teeth 6" of the hub ring 2 engages in a tooth space formed between the teeth 6' of the hub body 1 and projects past it axially. At the same time, the teeth 6' of the hub body 1 engage in the tooth spaces of the hub ring 2 which arc formed between the teeth 6". After producing this offset of the teeth 6', 6", the hub body 1 and the hub ring 2 are connected with one another via the weld seams 10 by the electron beam welding method. The broken lines in FIG. 2 show schematically how the clutch disks 8, 9 contact a stop of the hub 5 formed by the offsetting of the teeth 6', 6".

The invention is not limited by the embodiments described above which are presented as examples only but can be modified in various ways within the scope of protection defined by the appended patent claims.

We claim:

1. A multiple-disk friction clutch, comprising: a hub which has an internal toothing and is placeable on a gear shaft so as to be rotationally fixed relative thereto; at least two clutch disks connected with the hub so as to be rotationally fixed relative thereto and so as to project radially over the hub; a stop provided between the clutch disks, so as to guide the hub axially relative to the clutch disks, the hub being formed of a hub body having an outer toothing and a hub ring which has a corresponding outer toothing, the hub body having a radial shoulder on which the hub ring sits, the outer toothing of the hub ring being offset by one tooth relative to the toothing of the hub body so as to form the stop for the clutch disks, the hub body and the hub ring being connected with one another so as to be rotationally fixed relative to one another.

2. A multiple-disk friction clutch according to claim 1, wherein the teeth of the hub body engage in spaces formed between the teeth of the hub ring and the teeth of the hub ring engage in spaces formed between the teeth of the hub body.

3. A multiple-disk friction clutch according to claim 1, wherein the hub body and the hub ring are welded together.

4. A multiple-disk friction clutch according to claim 1, wherein the internal toothing is formed on the hub body.

* * * * *